(12) United States Patent
Blake et al.

(10) Patent No.: US 11,082,323 B2
(45) Date of Patent: Aug. 3, 2021

(54) FAULT MONITORING IN A UTILITY SUPPLY NETWORK

(71) Applicant: Spatialbuzz Limited, Guildford (GB)

(72) Inventors: Andrew Robert Blake, Guildford (GB); Michael Robert John Shannon, Redhill (GB)

(73) Assignee: Spatialbuzz Limited, Guildford (GB)

( * ) Notice: Subject to any disclaimer, the term of this patent is extended or adjusted under 35 U.S.C. 154(b) by 256 days.

(21) Appl. No.: 15/427,375

(22) Filed: Feb. 8, 2017

(65) Prior Publication Data
US 2017/0230272 A1    Aug. 10, 2017

(30) Foreign Application Priority Data

Feb. 9, 2016    (GB) .................................... 1602322

(51) Int. Cl.
| H04L 12/26 | (2006.01) |
| H04W 24/04 | (2009.01) |
| H04W 4/02 | (2018.01) |
| H04M 3/08 | (2006.01) |
| H04W 4/38 | (2018.01) |
| H04L 12/24 | (2006.01) |
| H04L 12/801 | (2013.01) |
| H04L 29/08 | (2006.01) |

(52) U.S. Cl.
CPC .......... *H04L 43/14* (2013.01); *H04L 41/0677* (2013.01); *H04L 43/065* (2013.01); *H04L 47/11* (2013.01); *H04L 67/12* (2013.01); *H04M 3/085* (2013.01); *H04W 4/025* (2013.01); *H04W 4/38* (2018.02); *H04W 24/04* (2013.01); *H04W 4/02* (2013.01)

(58) Field of Classification Search
CPC ......... H04L 43/14; H04L 47/11; H04L 67/12; H04L 41/0677; H04M 3/085; H04W 24/04
USPC ......................................................... 709/224
See application file for complete search history.

(56) References Cited

U.S. PATENT DOCUMENTS

| 5,561,841 | A | | 10/1996 | Markus |
| 5,771,274 | A | * | 6/1998 | Harris ..................... H04M 3/08 340/3.43 |
| 6,496,850 | B1 | * | 12/2002 | Bowman-Amuah ....................... G06F 9/4493 709/203 |
| 6,654,914 | B1 | | 11/2003 | Kaffine et al. |

(Continued)

FOREIGN PATENT DOCUMENTS

| CN | 101800440 A | 8/2010 |
| CN | 102130503 A | 7/2011 |

(Continued)

OTHER PUBLICATIONS

Examination Report dated Dec. 11, 2017 by UK Intellectual Property Office in application No. GB1602320.2.

(Continued)

*Primary Examiner* — Wing F Chan
*Assistant Examiner* — Leon Y Tseng
(74) *Attorney, Agent, or Firm* — Merchant & Gould P.C.

(57) ABSTRACT

The network monitoring tool comprises an input for receiving data about the performance of the network and a data processor for analysing the data in order to produce an output. The output is at least one of the identification of a fault in the network and the derivation of information about the capability of the network to supply the utility.

18 Claims, 12 Drawing Sheets

(56) References Cited

U.S. PATENT DOCUMENTS

| | | |
|---|---|---|
| 6,718,271 B1 | 4/2004 | Tobin |
| 7,111,059 B1 | 9/2006 | Garcea et al. |
| 7,441,154 B2 | 10/2008 | Klotz et al. |
| 7,684,321 B2 | 3/2010 | Muirhead et al. |
| 7,844,440 B2 | 11/2010 | Nasle et al. |
| 7,941,136 B2 | 5/2011 | Reed et al. |
| 8,060,079 B1 | 11/2011 | Goyal et al. |
| 8,098,590 B2 | 1/2012 | Catovic et al. |
| 8,213,319 B2 | 7/2012 | Spott et al. |
| 8,238,258 B2 | 8/2012 | Manthoulis |
| 8,661,295 B1 | 2/2014 | Khanna et al. |
| 8,687,506 B2 | 4/2014 | Reese et al. |
| 8,713,621 B2 | 4/2014 | White |
| 8,838,093 B2 | 9/2014 | Hága et al. |
| 8,953,472 B2 | 2/2015 | Di Pietro et al. |
| 9,001,667 B1 | 4/2015 | Khanna et al. |
| 9,009,305 B1 | 4/2015 | Callau |
| 9,015,312 B2 | 4/2015 | Magyar et al. |
| 9,104,543 B1 | 8/2015 | Cavanagh et al. |
| 9,197,495 B1 | 11/2015 | Rauser et al. |
| 9,210,038 B1 | 12/2015 | Rauser et al. |
| 9,236,770 B2 | 1/2016 | Gelman et al. |
| 9,237,474 B2 | 1/2016 | Hui et al. |
| 2003/0083073 A1 | 5/2003 | Cossins et al. |
| 2003/0134599 A1 | 7/2003 | Pangrac et al. |
| 2004/0261116 A1* | 12/2004 | McKeown ......... H04L 12/2801 725/109 |
| 2006/0085538 A1 | 4/2006 | Newman |
| 2006/0087409 A1 | 4/2006 | Korzeniowski |
| 2006/0146992 A1 | 7/2006 | Paden et al. |
| 2006/0233311 A1* | 10/2006 | Adams, Jr. ......... H04L 41/0659 379/21 |
| 2007/0076598 A1* | 4/2007 | Atkinson ............ H04L 47/10 370/229 |
| 2008/0198754 A1 | 8/2008 | Savoor et al. |
| 2008/0262820 A1 | 10/2008 | Nasle |
| 2009/0063122 A1 | 3/2009 | Nasle |
| 2009/0227251 A1 | 9/2009 | Lei et al. |
| 2010/0088410 A1 | 4/2010 | Ridley |
| 2010/0169030 A1 | 7/2010 | Parlos |
| 2010/0318641 A1 | 12/2010 | Bullard et al. |
| 2013/0054174 A1 | 2/2013 | Blank et al. |
| 2013/0088975 A1 | 4/2013 | Rahman et al. |
| 2013/0157688 A1 | 6/2013 | Kateley et al. |
| 2014/0075244 A1 | 3/2014 | Takahashi |
| 2014/0280884 A1 | 9/2014 | Searle et al. |
| 2014/0297826 A1 | 10/2014 | Park |
| 2015/0189511 A1 | 7/2015 | Lapidous |
| 2015/0326455 A1 | 11/2015 | Hui et al. |
| 2017/0230850 A1 | 8/2017 | Blake et al. |

FOREIGN PATENT DOCUMENTS

| | | |
|---|---|---|
| CN | 102355057 A | 2/2012 |
| CN | 103903058 A | 7/2014 |
| EP | 2230864 A1 | 9/2010 |
| GB | 201212246 A | 1/2014 |
| WO | 2009/022055 A1 | 2/2009 |
| WO | 2009/109138 A1 | 9/2009 |
| WO | 2011/001188 A1 | 1/2011 |
| WO | 2011/134501 A1 | 11/2011 |
| WO | 2012/109219 A1 | 8/2012 |
| WO | 2015/044467 A1 | 4/2015 |

OTHER PUBLICATIONS

Search Report for British Patent Application No. 1602322.8, dated Jul. 29, 2016.

Combined Search and Examination Report for British Patent Application No. 1602321.0, dated Jul. 28, 2016.

Combined Search and Examination Report for British Patent Application No. 1602320.2, dated Jul. 28, 2016.

U.S. Appl. No. 15/427,358, Office Action dated Apr. 16, 2019, 53 pages

U.S. Appl. No. 15/427,358, Office Action dated Nov. 5, 2018, 39 pages.

* cited by examiner

FAULT MONITORING IN A UTILITY SUPPLY NETWORK

FIELD OF THE INVENTION

The invention relates to the management of faults in a utility supply network, such as a cellular communications network. Management of faults may extend to one or more of identifying the type of fault that has arisen, identifying the location of the fault within the network and determining the expected time to repair the fault, and to signalling the results of one or more of these actions.

BACKGROUND

Faults occur in utility supply networks, as in all other complex technical systems. In the context of a cellular, or mobile, network, such faults include the failure of hardware components in the base-stations of the mobile network, failures in other systems which are connected to multiple base-stations (for example the radio network controller—RNC—in a 3G system and which then result in the loss of operation of large sections of the network—e.g. all node B base-stations connected to the RNC) and failures to switching and other more centralised functions, which again would impact multiple areas of the network simultaneously.

When such failures occur, it is important to identify them as quickly as possible, both so that maintenance teams can be dispatched to repair the fault and restore service to the customers of the network and also to enable these same customers to be kept informed about the fact that a failure has occurred (hence relieving customer anxiety that their mobile device may be at fault) and also about the progress of a repair and the likely time at which service will be restored. Such information on service failures and repair progress may be provided by a customer service operative on a 'helpline' provided by the network operator or via a web-page, mobile phone 'app' or other similar interface available to the end user of the network services.

In other situations, network services may be suspended in order to carry out planned maintenance or upgrades to the network. In such circumstances, the elements of the network (e.g. base-station or stations) which will be affected are known in advance and the duration of the service outage can also be estimated with a reasonable degree of certainty.

In still other situations, poor service may occur as a result of congestion on the network—too many users attempting to make use of too many of the network's resources, simultaneously. Such situations can occur, for example, during rush hour at a busy train station or around the time of an irregular event, such as a sports match or music concert, at a particular location.

At present, operators rely upon a disparate array of systems for managing and reporting faults, planned network outages, progress updates for repairs which are underway and the identification and location of congestion events and other aspects which impact a customer's experience of a mobile operator's network. For a customer, however, all of the above causes result in a single outcome: poor (or no) mobile service. Reporting to customers the fact that such issues are known (or not, which may indicate a problem with the user's mobile device) and when they are likely to be resolved, is becoming increasingly important, in the quest to retain customers and reduce customer 'churn' (customers moving from one service provider to another).

SUMMARY OF THE INVENTION

According to one aspect, the invention provides a network monitoring tool for fault monitoring in a utility supply network. The network monitoring tool comprises an input for receiving data about the performance of the network and a data processor for analysing the data in order to produce an output. The output is at least one of the identification of a fault in the network and the derivation of information about the capability of the network to supply the utility. Thus, the invention provides a way of monitoring faults in a network that facilitates the remediation of faults, the dissemination of information about the performance of the network and/or the implementation of improvements to the network to enhance delivery of the utility.

In certain embodiments, the data processor is a processor, a suite of processors or a computer. In certain embodiments, the data processor is arranged to produce the output in response to a user query about the performance of the network. In certain embodiments, the information that is provided about the performance of the network is an assessment of the performance of the network at a location specified in the user query. In certain embodiments, the assessment includes, in respect of a failure in the network at the location, an indication of at least one of an expected end time of the failure and a cause of the failure.

In certain embodiments, the data about the performance of the network is of several types. In certain embodiments, the network monitoring tool further comprises a combiner for assembling into a record the several different types of data as received over a predetermined period of time. The data processor is arranged to retrieve and analyse the record in order to produce the output. The retrieval of the record by the data processor may not be synchronised with the creation of the record by the combiner.

In certain embodiments, the types of data involved are two or more of: a group of one or more alarm signals, each intended to warn of failure of a respective item of equipment forming part of the network; measurements of performance of equipment forming part of the network; information about known inability of equipment forming part of the network to satisfy user demand for the utility; geographic locations of equipment forming part of the network; information about maintenance that is scheduled to be performed on equipment forming part of the network; information about the extent of the geographic area to which the network supplies the utility; and information about weather conditions where equipment forming part of the network is located.

In certain embodiments, the type of utility supply network that the invention is designed to monitor is a communications network. In certain embodiments, the communications network monitored by the invention is of a type that comprises a plurality of nodes through which network traffic passes and, if available and exploited by an embodiment of the invention, the information about known inability includes a time of day at which the flow of traffic through a node experiences congestion. In certain embodiments, the communications network monitored by the invention is a mobile communications network that includes one or more of a base station, a cell-site, a radio network controller, a base station controller and a back-haul link. In certain embodiments, the type of utility supply network that the invention is designed to monitor is a broadband internet access network, a water supply network, a gas supply network or an electricity supply network.

The invention also relates to methods for performing the functions that the network monitoring tool can provide. Further, the invention relates to instructions for causing data processing equipment, such as a computer workstation, to carry out such methods.

BRIEF DESCRIPTION OF THE FIGURES

By way of example only, certain embodiments of the invention will now be described by reference to the accompanying drawings, in which.

DETAILED DESCRIPTION

Figure 1:
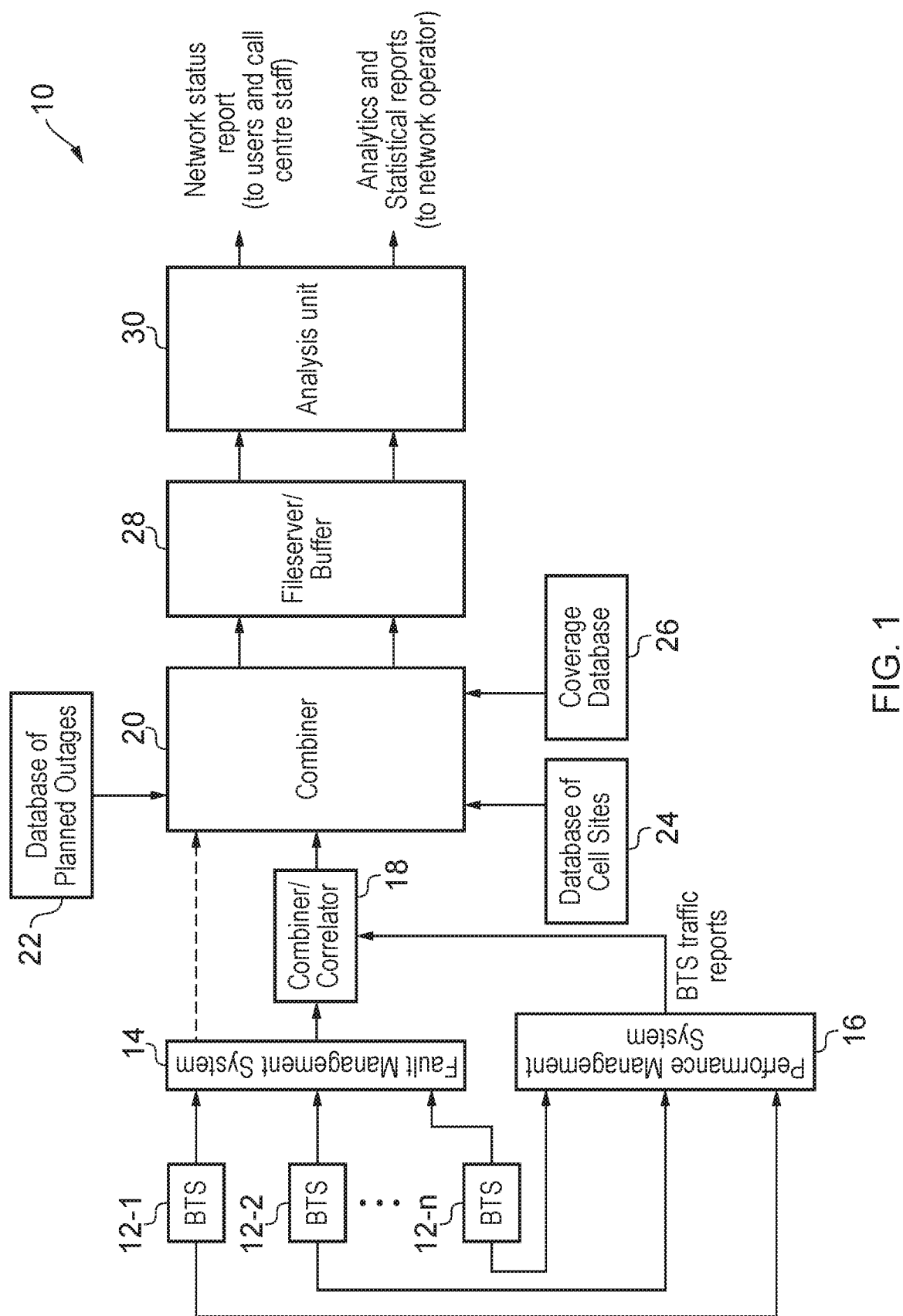
FIG. 1 is a block diagram schematically illustrating the architecture of a network monitoring tool that is connected to a network that is to be monitored.

An outline of the architecture of a network service reporting system (NSRS) 10 for a mobile network is shown in FIG. 1. The NSRS 10 includes a fault management system 14, a performance management system 16, a combiner/correlator 18, a main combiner 20, a database of planned outages 22, a database of cell sites, 24, a coverage database 26, a file server/buffer 28 and an analysis unit 30. The NSRS 10 takes input from n base stations 12-1, 12-2, . . . 12-*n* of the mobile network that is being monitored. The n base stations may be all of the base stations in the mobile network or just some subset of the base stations in the mobile network.

Each of the blocks 14-30 in the NSRS 10 could be implemented by a physically separate piece of data processing and/or data storage hardware (such as a personal computer, a server, a hard disk storage unit or the like) or some of the blocks could be implemented in a single piece of hardware (e.g. the main combiner 20 and the fileserver/buffer 28 may well be combined within a single piece of hardware). It is also possible that some or all of the hardware that implements blocks 14-30 could be virtualized and be assigned to disparate hardware elements by a third-party service provider, such as a cloud computing services provider. In this case, a 'server' could actually be a virtual server, with tasks executed and spread across a number of physical hardware devices, potentially in different physical locations.

It is possible that the network operator is unaware that there is a problem, based upon the alarm signals or messages that it is receiving from the various network elements. The network service reporting system 10 is capable of distilling from these various, disparate pieces of information provided by the network elements, a single coherent message indicating to the network operator that there is a fault in the network that requires attention.

For example, and assuming that the mobile network being monitored is a 3G network, it is possible for a radio network controller (RNC) to fail. Such a failure would cause the traffic from a large number of base-stations to fail to connect to the remainder of the operator's network (and outside). The base-stations themselves would still be fully functional and would report no alarm conditions, however the users of the network would experience severe disruption. In this case, the network operator could remain unaware of the problem, until such time as the RNC reported a fault. The reporting of such a fault can be delayed by many hours, for various reasons, with the result that the first indication that a problem might exist is when customer service staff begin to receive a large number of complaints from users. This is clearly a far from ideal way for an operator to learn of faults in its network. Furthermore, there is currently no way for customer service operatives to report, in a meaningful way, where the problems are occurring. The result of this is that an operator knows that a major problem exists, but not where (geographically or within his network equipment) the fault has occurred.

The NSRS 10 also distils from a range of disparate inputs (arising, typically, from disparate physical parts of the mobile network operator's system) a single, coherent message which can easily be understood by both users of the mobile communications system and call centre staff or other customer services staff (e.g. staff located in mobile phone retailers). This message provides an indication as to whether the mobile network is thought by the operator to be operating correctly in a given geographical location (where the user is, currently, or about which the user has submitted a query, perhaps due to an earlier problem). If the user is kept informed about the problem (if it is known) and its resolution, then he/she is less likely to be dissatisfied with the service provided by the network operator and hence less likely to switch to another network operator.

The NSRS 10 is able to provide an informed view of the status of a network, to both an end-user and to customer service personnel and maintenance/operations personnel, within a network operator. The various elements shown in FIG. 1 will now be discussed in more detail.

Base stations 12-1 to 12-*n* form part of the mobile network that is being monitored. The base stations 12-1 to 12-*n* are configured to send alarm signals when certain fault conditions are detected, e.g. the voltage of the power supply to the base station drops below a predetermined threshold. The alarm signals from the base stations 12-1 to 12-*n* are fed to the fault management system 14, which amalgamates the alarm messages and provides amalgamated data on all of the alarms existing within the network at that time. This data can either be passed directly to the main combiner 20 (dashed line) or to the combiner/correlator 18, the function of which will be described below.

The performance management system 16 receives from each base station 12-1 to 12-*n* information on the amount of traffic being handled and various other performance measures, such as the number of dropped calls, the number of attempted calls which fail to connect, etc. Again, this information is fed to the combiner/correlator 18 (notably the traffic level information, in particular).

The database of planned outages 22 stores all of the planned maintenance operations on the network and which parts of the network will be impacted (e.g. which base-stations will be turned off and for how long they are anticipated to be off-air).

The database of cell sites 24 stores the locations of all of the cell sites (or base station sites) in the network, together with information about each site (e.g. transmit power level capability, antenna pointing directions and down-tilt angles, etc.). There are frequently errors in this database, such as occur when antenna feeder cables have been (inadvertently) swapped during the installation of the base station, meaning that the antenna pointing directions are recorded, in a typical tri-sector example, 120 degrees in error.

The coverage database 26 is typically provided, either directly or indirectly, from a network planning tool. In some instances, it is provided by a networking planning tool and then stored and updated separately, while, in other cases, it is provided directly as a part of a network planning tool's own database. The entries in the coverage database 26 may be modified as a result of drive testing, or other network coverage intelligence (e.g. collected from signal strength measurements taken by the network from its users' mobile devices). The coverage database 26 is a record of the geographical locations in which the network operator asserts that coverage is available.

The combiner/correlator 18 takes as its inputs base station traffic reports provided by the performance management system 16 and the base station alarm information provided by the fault management system 14. From these inputs, the combiner/correlator 18 calculates whether there is a potential or unplanned outage (or outages). If, for example, the fault management system 14 is indicating that all of the base stations 12-1 to 12-n are operating normally, but the performance management system 16 indicates that no traffic is being handled by one particular base station, then it is possible that this base station (or its associated backhaul system) may have developed a fault and that this fault has not been picked up by the (limited) range of alarms which the base station can report. This can then be flagged up to the analysis unit 30 (via the intervening elements, as discussed below) which can determine, in conjunction with its other input information (e.g. location), if there really is a fault or if, for example, no traffic is being reported from this BTS due to the time of day (or, more likely, night) or its location (e.g. rural and hence lightly used). If a fault is determined by the analysis unit 30, then a repair can be initiated.

The main combiner 20 simply combines all of the information provided by the performance management system 16, the combiner/correlator 18, the main combiner 20, the database of planned outages 22, the database of cell sites, 24, the coverage database 26 and optionally also the fault management system 14 into a single file or directory of information.

The fileserver/buffer 28 takes the combined information, generated by the main combiner 20, and makes it available for retrieval by the analysis unit 30. The information could be stored, for example, as a ZIP file, a CSV (comma-separated values) file or other suitable format. The data is assembled into a data package, containing one or more files or directories, each of which is time-stamped to indicate the time period to which the package relates. The time period covered by such a data package could be, for example, the interval between noon and one minute past noon. The data package contains details of any reported events that arise in, or continue into, the time period to which the data package relates. As should be clear from the foregoing description, these events could be events that are detected during the period covered by the data package (e.g., base station failure alarms) or events that are scheduled or predicted to occur in that time period (e.g., planned maintenance).

The analysis unit 30 takes, from the fileserver/buffer 28, the file containing all of the data provided by the various sources discussed above and processes it to provide information on the status of the network at any requested geographic location within the network, at (or close to) the time of the request. Its functionality will now be discussed in greater detail.

The analysis unit 30 takes, as its input, the file or directory of information that is made available by the fileserver/buffer 28, and which contains the above-discussed network status and configuration information, covering a specific period of time. Utilising a file or directory as a means of transferring the data means that the network operator's system and the (third-party) analysis unit 30 do not need to be closely synchronised/coupled and no streaming information needs to be provided. This is acceptable, since fault reporting does not, typically, need to be undertaken within milliseconds, for example. A report within seconds or minutes is typically more than adequate. The use of a file-based transfer of information about the operator's system into the analysis unit 30 is therefore a simple, elegant and sufficiently timely solution and provides robust protection against dataset transfer interruption.

The analysis unit 30 analyses the file received from the main combiner 20 to combine items of information which enable conclusions to be reached which couldn't (validly) be reached with the pieces of information taken individually. For example, in the case discussed above of a lack of reported traffic from a site, but with no base station alarms being reported, the analysis unit 30 could also look at the list of planned outages; if this indicates that the relevant base station is undergoing maintenance or replacement, then this is the likely explanation for the lack of alarms (the base station is likely to be turned off or disconnected). It would also show no traffic. The analysis unit 30 can also interrogate the base station or cell site location and coverage information within the file, to determine the geographical area which is likely to be impacted by the maintenance and thereby reply to any (user-initiated or customer service representative-initiated) query from that area, with detailed information about the source of the network problem (planned maintenance, in this case) and the likely duration (again coming from the 'database of planned outages'). In this way, the requestor is supplied with accurate, timely and rich information about the problem.

As a second example, consider the case where a user is experiencing a problem in a particular location, yet the alarms from the base stations in that area are not indicating a problem. The analysis unit 30 can examine the data from the performance management system 16; if this is indicating a high degree of usage at a particular cell site or base station in the relevant area, then the likely explanation for the user's problems is that the site is congested. Again, this can be fed back to the requestor, optionally including a likely time that the congestion will ease (based upon historic knowledge of the congestion patterns at that particular site, for example).

As a third example, consider the case where a user is experiencing a problem in a particular location, the alarms from the base stations in that area are not indicating a problem and the performance management system 16 indicates that there is little or no usage of the network at that time. The analysis unit 30 can conclude from the alarm data and the performance data that there is a fault impacting the user's location. This can be reported to the user (to assuage concerns) and to the network operator (to initiate a repair).

As a fourth example, a mobile network typically relies upon many more network elements than just the base-stations. For example, backhaul of the signals to/from the base-station is typically provided by either microwave links or fibre-optic links. Likewise, the base-stations are controlled by other elements, such as an RNC (radio network controller) in the case of the 3G network, and will also be connected to some form of control and/or switching system, such as a MSC (mobile switching centre) in the case of a 3G network. In the case of a BSC (base station controller) or MSC in a 3G network (or any similar element in a different mobile communications architecture), the failure of such a network element will lead to multiple base-stations being unable to communicate successfully with their connected users. The analysis unit 30 can recognise such a condition, based upon the pattern of user fault reports or queries across the area in which are located the base stations subservient to the BSC or MSC. The analysis unit 30 can therefore recognise that a fault has occurred faster than many other mechanisms of fault reporting and will cover mechanisms which are simply not reported by the limited range of, typically hardware-related, alarms which are fitted to the base-stations or other network elements. One example of such a fault mechanism would be a software glitch, partial 'crash' or infinite loop; such operation may appear 'normal' to the limited hardware alarms but result in a complete loss of normal service to the network users.

Note that, as discussed above, the fault management system can report directly to the main combiner of the NSRS 10 (as shown by the dashed-line in FIG. 1). This reporting method can be used, however experience has shown that using this mechanism alone can lead to a large number of 'false alarms', i.e. hardware faults reported in one or more base station systems when no such fault exists in reality and the base station is functioning acceptably, or where a low-level fault exists, but where the base-station can continue to operate, perhaps with a slightly reduced coverage area or overall capacity. It is possible that this situation occurs because the fault management system 14 takes a very pessimistic view of a fault and reports it as 'catastrophic', when in fact it only has a minor impact. For example, if a 'low transmit power' alarm is set, this could indicate anything from a complete loss of transmit power through to the power output falling just below specification. In the former case, this would clearly have a major impact on the network and would be a solid indicator that the NSRS 10 should report such a problem in response to a user query; in the latter case, the impact upon the network would be negligible and a user-reported problem would almost certainly have another cause (or just prove to be a single, spurious, report, where perhaps a handset problem is the real issue).

The output or response provided by analysis unit 30 in response to a user query, can take a variety of forms. For example:

If the user places a call to a customer service centre, then the operator can inform the customer of the situation, based upon data delivered to his/her computer screen from the analysis unit 30 (in response to location data from the user, inputted into the NSRS 10 by the customer service representative).

A query can be submitted via an 'app' on the user's mobile device, with a response coming back via the app or a text message or other delivery means to the user's mobile device.

A query can be submitted via a web page, either on the user's mobile device or any other suitable (fixed or mobile) terminal, with a response coming back via the same or another web page or another means, such as a text message.

Social media feeds (e.g. Twitter, Facebook, web-chats etc.) can be monitored (either automatically via suitable software or manually by human operatives) for 'chat' indicating a likely service outage at a particular location. Feedback can be provided via the same social medium (or more widely, via all popular social media).

Many network operators have a presence on the high street via their own, branded, shops or concessions within other shops. Customers will sometimes complain of coverage issues, in person, when visiting such outlets; feedback can be provided directly by the store staff.

Clearly, there exists a wide range of ways that the relevant data could be presented (notably via an app or a website). However, as an example, the following reporting mechanism could be used.

RED. A known problem exists covering the user's location. This could be due to, for example:
  Planned work on the network, i.e. a planned outage for maintenance.
  A nearby site has failed, and this is known about already (e.g. through other user reports and a subsequent investigation by the network operator).
  A highly-likely site failure, identified from the large volume of submitted queries/complaints from users in a specific area (and covered by the same site, or sites using the same BSC, MSC, backhaul infrastructure, etc.). Once the number of queries, from a given geographical location, exceeds a certain threshold, then it is deemed that a fault must exist in that location, even though the network itself (e.g. alarms, fault management systems etc.) has not otherwise reported or identified a fault.

AMBER. The operator is aware of issues in the area (e.g. capacity problems), however users should not be severely impacted (and the problem will resolve itself without explicit action, such as a repair, by the network operator). Or there is a known issue slightly further away and, whilst the user should not be impacted, it is possible that the issue could be the cause of any disruption.

GREEN. No problem is known to exist at that location or with any site which should cover that location (where the coverage area could be hundreds of metres, in dense urban areas, to tens of km in rural areas). In this case, it may be that the user is the first to spot/report a genuine fault, or it could be that there is an issue with their mobile communications device.

GREY. The network does not claim to (and is not designed/predicted to) cover that geographical location.

The sources of information provided to the combiner 20 can be combined in order to provide statistical or analytical information to a network operator, regarding the performance of his/her network. Such information could include:
  The number and type of faults which are identified by crowd-sourcing prior to being identified by more traditional means (e.g. equipment alarms and fault management systems).
  The time between the reporting of a potential issue by crowd-sourcing and the identification of that issue by more traditional means.
  The number and types of issues which are identified by crowd-sourcing and which are never identified by more traditional means.

Figure 2:
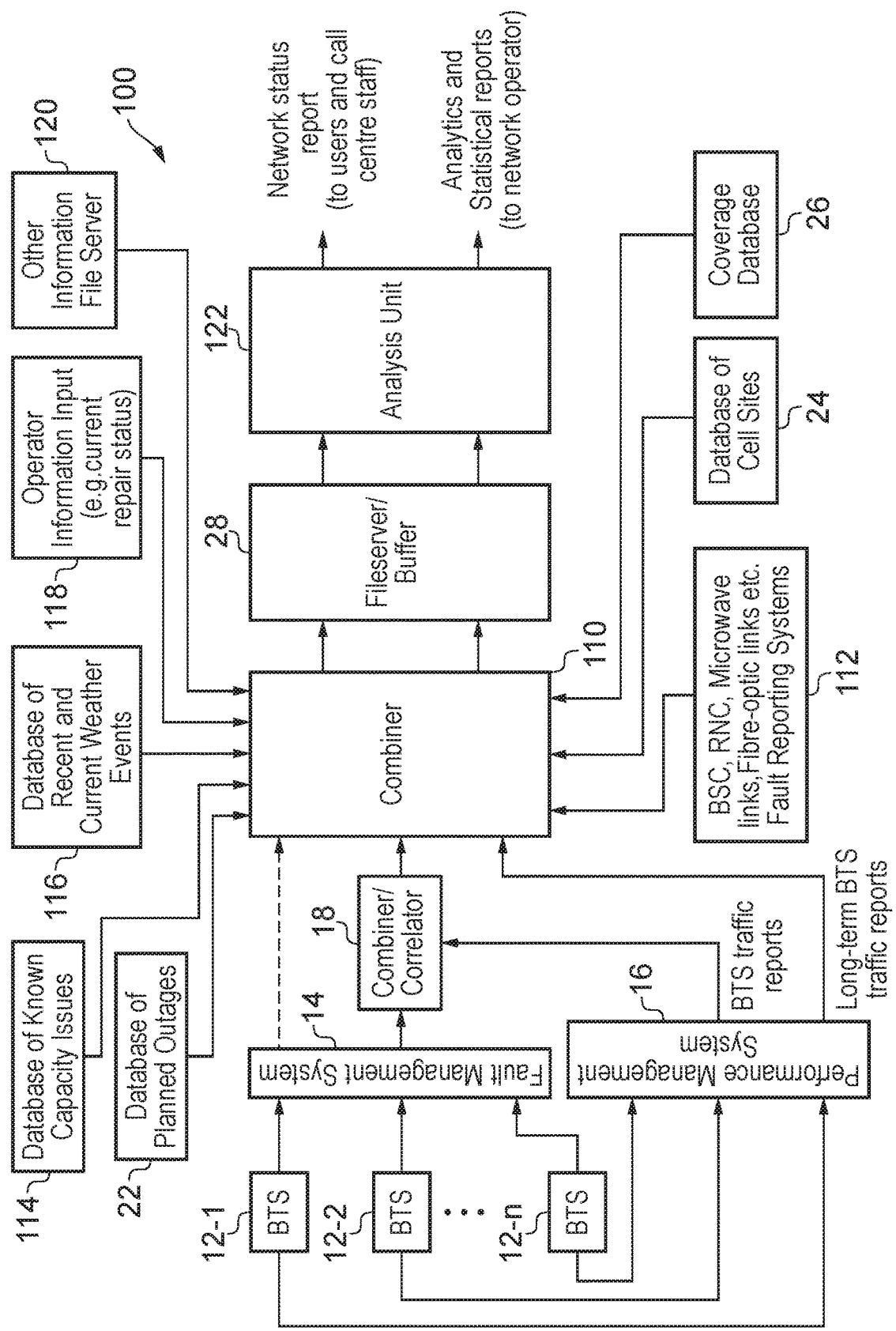
FIG. 2 is a block diagram schematically illustrating the architecture of another network monitoring tool that is connected to a network that is to be monitored.

FIG. 2 shows an enhanced NSRS 100. In this case, a larger (richer) dataset is available, from a wider range of data sources. The operation of this system is similar to that discussed above, however the further input sources provided allow a better understanding of the network's issues to be divined and reported. Elements of the NSRS 10 of FIG. 1 that have been carried over to the NSRS 100 of FIG. 2 retain the same reference numerals in FIG. 2 and their purpose will not be described again here.

In the NSRS 100, the combiner 110 is different to that employed in NSRS 10 of FIG. 1 in that combiner 110 combines into the file or directory that it prepares for the fileserver/buffer 28 information from additional data sources. The analysis unit 122 in NSRS 100 of FIG. 2 is different to the analysis unit 30 of NSRS 10 of FIG. 1 in that analysis unit 122 has a wider range of data types to draw on when searching for faults in, or replying to queries about, the operator's network. The additional input data sources made available to combiner 110 will now be discussed.

The database of known capacity issues 114 is a database in which all of the known capacity issues (i.e., difficulties in meeting user demands on the service) within the network are stored. Such capacity issues will only occur at particular times of day, with the time of day (and day of the week) at which issues typically occur varying from site to site. For example, a cell site located close to the entrance to a busy commuter train station might suffer capacity problems during the morning and evening rush hours from Monday to Friday, but not suffer any capacity problems at the same times on a Saturday or Sunday. Likewise, a base station located in a commuter town could suffer capacity issues in the evenings and at weekends, but not during the working week.

The capacity issues discussed above could well be the correct explanation as to why a user is struggling to make a call, for example, during known periods of high cell-site usage. In cases where moderate numbers of queries are being made, relating to the area covered by that site and at a time of known high usage, then the analysis unit 122 could respond to such queries by indicating that available network capacity is likely to be the issue and that normal conditions will resume after a given time (where that time is based upon past experience of when the capacity issue subsides).

In the case where very high volumes of queries are being submitted, in the area surrounding the congested site, the analysis unit 122 could indicate to the network operator that equipment at the cell-site has likely failed, thus prompting the network operator to visit the site and effect a repair.

Severe weather can have a significant impact upon the operation of a base station or cell site (or even a group of sites). For example, very heavy rain can impact upon the performance of the microwave links which provide backhaul to the cell site (or sites); if the microwave link fails (or is operating at a severely-reduced capacity), then the site is, in effect, 'off-air', even though the base station or cell site itself would be reporting no issues/alarms. Likewise, lightning activity can destroy a base station or its antenna or feeder cable systems. The database 116 provides the combiner 110 with information about current and recent weather events that might impact network performance so that the analysis unit can make an improved diagnosis of the likely cause of a service outage in a particular area, which could also be used as a reply to a query from a user of the network.

During the progress of a fault and its repair, network operations (control centre) staff will typically be kept informed of the cause of the fault and the status of the repair process. Such updates can come in a variety of ways, such as phone calls from the repair technician. The network operations staff can supply this information as a feed 118 into the combiner 110 so that the analysis unit 122 can use the information to indicate to customers the progress of the repair and the time by which normal service is expected to resume.

As discussed earlier, a mobile network typically relies upon many more network elements than just the base-stations. For example, backhaul of the signals to/from the base-station is typically provided by either microwave links or fibre-optic links. Likewise, the base-stations are controlled by other elements, such as an RNC (radio network controller) in the case of the 3G network, and will also be connected to some form of control and/or switching system, such as a MSC (mobile switching centre) in the case of a 3G network. Automated fault-reporting systems can be associated with such elements, but they are often simple and designed for reporting easily recognised faults, which are normally severe in nature. Information from these fault reporting systems is provided as a further feed 112 to the combiner 110 so that the analysis unit 122 can use the data to assist in the diagnosis and reporting of faults and in responses to user queries.

Information feed 120 to combiner 110 represents other sources of information that may be available, from time to time and which are also relevant to the operation of the network. For example, news reports could detail the emergence of terrorist activity, either directly targeting communications infrastructure or targeting a major city or event (and thereby generating a huge amount of network traffic at a time and in a location where capacity is usually not an issue). Such information could be provided from a website, a streaming news service, via a file deposited in a drop-box style buffer store or any other suitable mechanism. The analysis unit could include appropriate information from feed 120 in its responses to user queries regarding the performance of the network.

All of the additional sources of information 112-120 can be combined, intelligently, by the analysis unit 122 in order to identify faults in the network and in order to inform a user, in response to a user query, with rich detail as to the cause of the problem, the progress of its repair and (optionally) the likely time of completion of the repair.

Figure 3:
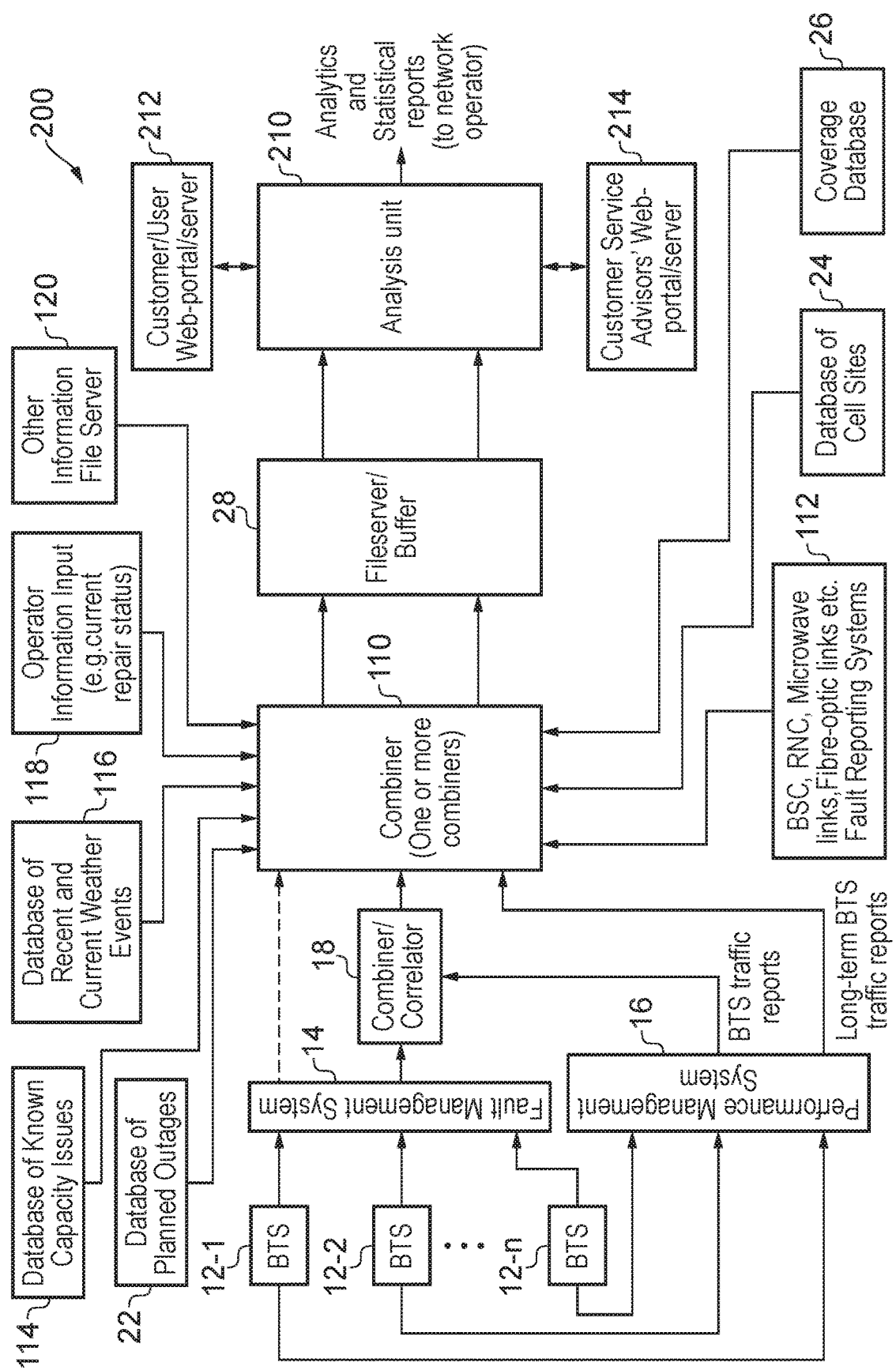
FIG. 3 is a block diagram schematically illustrating the architecture of yet another network monitoring tool that is connected to a network that is to be monitored.

FIG. 3 shows an enhanced NSRS 200. In this case, more powerful use is made of queries about network performance, whether from users, customer service operatives or network maintenance/management personnel. Elements of the NSRS 100 of FIG. 2 that have been carried over to the NSRS 200 of FIG. 3 retain the same reference numerals in FIG. 3 and their purpose will not be described again here.

In the NSRS 200, the analysis unit 210 is different to that employed in NSRS 100 of FIG. 2 in that analysis unit 210 utilises data provided by two query portals 212 and 214. Each of the portals 212 and 214 is implemented by a server that provides clients with a web form for instructing the analysis unit 210. The portals 212 and 214 provide much the same function but to different groups of people.

Portal 212 is a user portal that allows users of the mobile network to submit queries about the performance of the network. In order to submit a query about the performance of the network, a user establishes a connection to the server that is the user portal 212 using a computer (such as a smart phone) and is served a web form for submission of the query. The form prompts the user to submit his or her current location, if he or she is experiencing problems at present, at that location, or the location at which he or she experienced a problem (in the event that coverage was lost at that location, hence making reporting impossible using his or her mobile device). The form is then returned to the user portal 212 with a time-stamp indicating the time the form was completed. It is possible for the form to include other fields for the user to complete, and entry of data into those fields may or may not be mandatory. As an example of a further field that could be included in the form, there might be a field for the user to indicate the nature of the problem (e.g. by selecting from a drop-down list of possible problems, such as: complete loss of signal, dropped call, slow data, poor call quality, etc.) Some examples of other fields that could be included in the form are the user's name, mobile device type, mobile phone/device (telephone) number, etc.

Note that the connection to the user portal 212 could be established by user commands issued to a program other than a browser on a computing device available to the user (for example, the program could take the form of an app on a smart phone). Additionally, if the device that the user is using to submit his or her query is location-aware (as would typically be the case when the device is a smart phone), then the user location could be supplied by the device rather than entered manually by the user.

Portal 214 is a network operative portal that allows the network operator's personnel (or sub-contracted call-centre personnel) to submit queries about the performance of the network. The network operative portal 214 can be established in the same ways as the user portal 212, the chief difference being in the role of the person making the query. Various types of operator personnel might initiate performance queries through the network operative portal 214. For example, a network operative concerned with the technical management of the network or fault repair might enter a performance query though the network operative portal 214 to ascertain information about the functioning or performance of the network at a particular location. Similarly, a customer service representative of the network operator might enter a performance query through the network operative portal 214 on behalf of an end-user who has enquired with the customer service representative about network performance at a specific location.

The analysis unit 210 interrogates the file obtained from the main combiner 110 in response to performance queries received through the portals 212 and 214. The analysis unit 210 responds to a performance query with information about the condition and performance of the mobile network in the location to which the query pertains. In this sense, the response provided by analysis unit 210 to a performance query is much the same as the response that would be provided by the analysis unit 122 of FIG. 2 and the analysis unit 30 of FIG. 1. For example, the analysis unit 210 could respond to a performance query by indicating that at the location concerned there is, as appropriate: a fault in the network (and perhaps also the estimated time at which the fault will be resolved); congestion in the network (and perhaps also the estimated time at which the congestion will ease); planned maintenance underway (and perhaps also the estimated time at which the maintenance will finish); or apparently nothing awry (suggesting to an end-user that his mobile device may be at fault).

The analysis unit 210 is arranged to store information from network performance queries and to use that information together with the information in the file obtained from the main combiner 110 in order to produce more powerful responses to future performance queries. An example of a rudimentary way in which the analysis unit 210 can make use of historical performance queries is to use the locations to which the queries correspond in order to establish the density of queries across the area covered by the network. Then, any location within the network that has a sufficiently high density of performance queries can be deemed to contain a fault. The density of queries could be used in more subtle ways. For example, the query density could be used as another factor (alongside, say, base station alarm conditions, network performance measurements, and maintenance schedules) in deciding the condition of the network that is reported in response to some new performance query. In this scenario, the analysis unit 210 could, in response to a performance query about a location, determine that there is no planned maintenance at the location, no base station alarm at the location, no traffic at the location but more than a threshold number of queries about the location over some predetermined historical period. Following this determination, the analysis unit 210 could reply to the query indicating that there is a fault at the location (without recourse to information about, say, the level of usage of the network that is expected at the time of the new query).

Note that it is entirely possible for the various sources of information 22-26 and 112-120 to fail, either individually or all together, such as when a major IT system failure occurs in the network operator's IT system. Since the web-based (or app-based) interface is typically hosted, together with the NSRS 200, on an entirely different system, such as one provided by a cloud-computing service provider, it is very unlikely that both the operator's and the cloud-service provider's IT systems will fail at the same time. This has the consequence that the web-based customer interface will still operate, will still collect information about where network problems are occurring and will still be able to keep end-users informed of the status of such faults (e.g. whether they are known or not) even if the main sources of fault information 22-26 and 112-120 within the network are not operational. This is a very useful result: customer service, in the form of the provision of useful customer information, is maintained even when major (or minor, localised) IT or other reporting failures occur within an operator's network.

Although, the concept of using query density to enrich responses to new user queries has been described in conjunction with a system, i.e. NSRS 200, that collects performance queries through portals implemented by servers, it will be apparent to the skilled person that the determination and exploitation of query density can be used in variants, such as NSRS 30 and 100, that use techniques other than portals 212 and 214 for receiving performance queries.

There are various way in which to exploit information about the locations in respect of which are submitted queries about network performance. As discussed above, the location in respect of which a performance query is submitted can be used by a NSRS to provide a response containing information pertinent to that location (e.g., there appears to scheduled maintenance underway). Also as discussed above, the locations in respect of which performance queries are submitted can be used to map query density over the extent of the network. It is also possible for a NSRS to analyse the distribution of performance queries in other ways in order to identify faulty equipment within the network.

Figure 4:
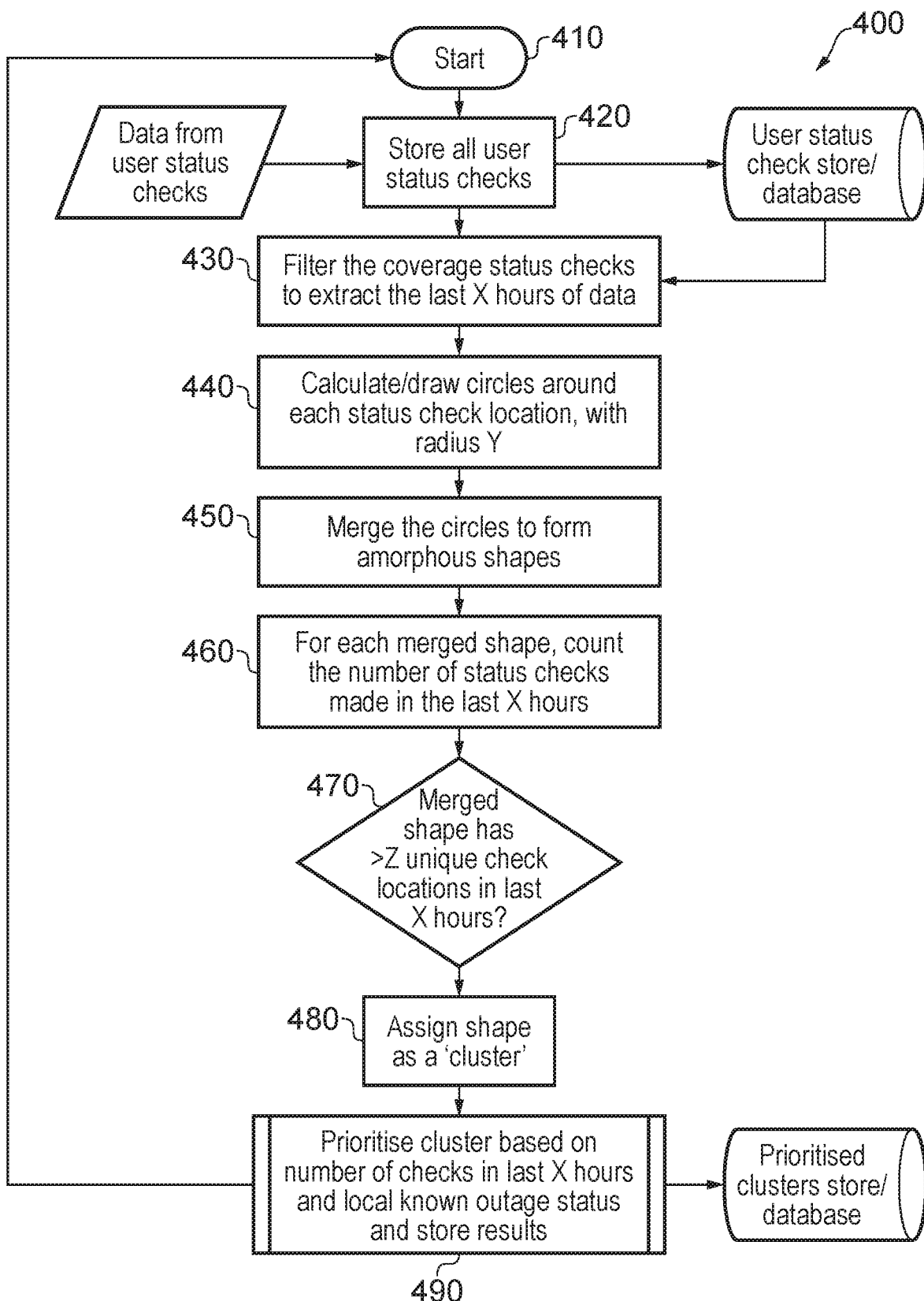
FIG. 4 is a flow chart illustrating a process performed by a network monitoring tool.

FIG. 4 shows an example of a 'cluster-forming' algorithm 300 that can be operated by an NSRS in order to assess whether a meaningful grouping of user fault reports exists, which might indicate a network fault (possibly unknown to the network itself or the network operations staff). The algorithm could be operated by, for example, the analysis unit 30 of NSRS 10, the analysis unit 122 of NSRS 100 or the analysis unit 210 of NSRS 200. The details of the algorithm 400 will now be discussed.

The algorithm starts 410 and then goes on to store 420 all of the geographic locations at which users have checked the status of the network (to see if a fault exists or to report network problems). The users can do this in a variety of ways, for example by filling in details on a dedicated web-page, utilising an app designed for the purpose on their mobile device, calling one of the operator's customer service representatives or reporting an issue to the sales staff at one of the operator's retail stores.

The stored locations at which users have made network status checks are then filtered 430 to extract the last X hours of data (where X could be 4, for example). This ensures that only 'live' issues are flagged up by the system, with historic (and likely repaired) issues thereby being decreasingly relevant. In effect, this process forms a 'sliding window' within which user reports are considered, with newer events gradually becoming more prominent (and hence evident as possible/likely faults) and older (probably resolved) events gradually becoming less prominent and eventually disappearing from the system/algorithm (although they may be stored indefinitely, if desired by the operator, for example to highlight unreliable sites which experience regular issues).

The algorithm 400 then moves on to calculate 440 circles surrounding the locations of user queries, where each circle in a given geographic area has a radius Y. The value of Y depends upon the type of location at which the user reports are made; for example Y may be 0.25 km in a built-up area, such as a city, or it could be anything from a few hundred metres up to many kilometres in a more rural location. The value of Y, therefore, is a fraction of the typical radius of coverage of the cells found in that location: larger cell radii will lead typically to larger values of Y and vice-versa.

Adjacent or closely located circles are then merged 450 to form amorphous shapes, each amorphous shape extending over a spatial zone. Within these amorphous shapes, for example, the number of distinct locations of user reports or queries submitted in the last X hours is summed 460 and the resulting number is compared 470 to a threshold value. If the total number of reports/queries exceeds a certain threshold (say, 3) then the amorphous shape is identified 480 as a 'cluster', i.e. an area which is likely to contain a network problem. Note that, in place of a threshold value, other filtering mechanisms could be used. For example: finding places with more than Z distinct users (by session ID), types of users (e.g. business, residential) etc.

An alternative method of identifying a cluster involves counting the number of reports/queries submitted from a given location where each report arises from a single, unique, user, with such unique users being identified by their unique user identifiers (e.g. their IMSI—International Mobile Subscriber Identity—number, or any other suitable, unique, identifier). In effect, this could be viewed as each unique user getting one 'vote', such that when the number of 'votes' exceeds a given threshold, a 'cluster' is identified. In this way, a cluster can be identified when a large number of unique-user reports are made from a single location (e.g. building).

The identified clusters are then ranked 490 in order of the number of reports/queries logged and in terms of whether a known network outage is located in the area covered by, or very close to, the cluster. Clearly, a known outage is very likely to be the explanation for the large numbers of queries/reports in that area and the customers can be informed accordingly (by the customer care staff, the dedicated web page or app etc.). Where no known outage exists, but a large number of queries/reports have been logged (recently), then it is likely that an unknown fault exists and customers can be informed (as outlined above) that an 'unknown problem has been identified and is under investigation'. The network operations/maintenance staff can also be informed and can begin to trace the fault. In this way, customers feel that they are being kept informed and are also reassured that they are not experiencing a fault with their device (thereby generating unnecessary technical queries to the operator or staff in its retail outlets). Likewise likely faults are identified quickly and can therefore be remedied before they escalate and generate, for example, bad publicity for the network operator.

Figure 5:
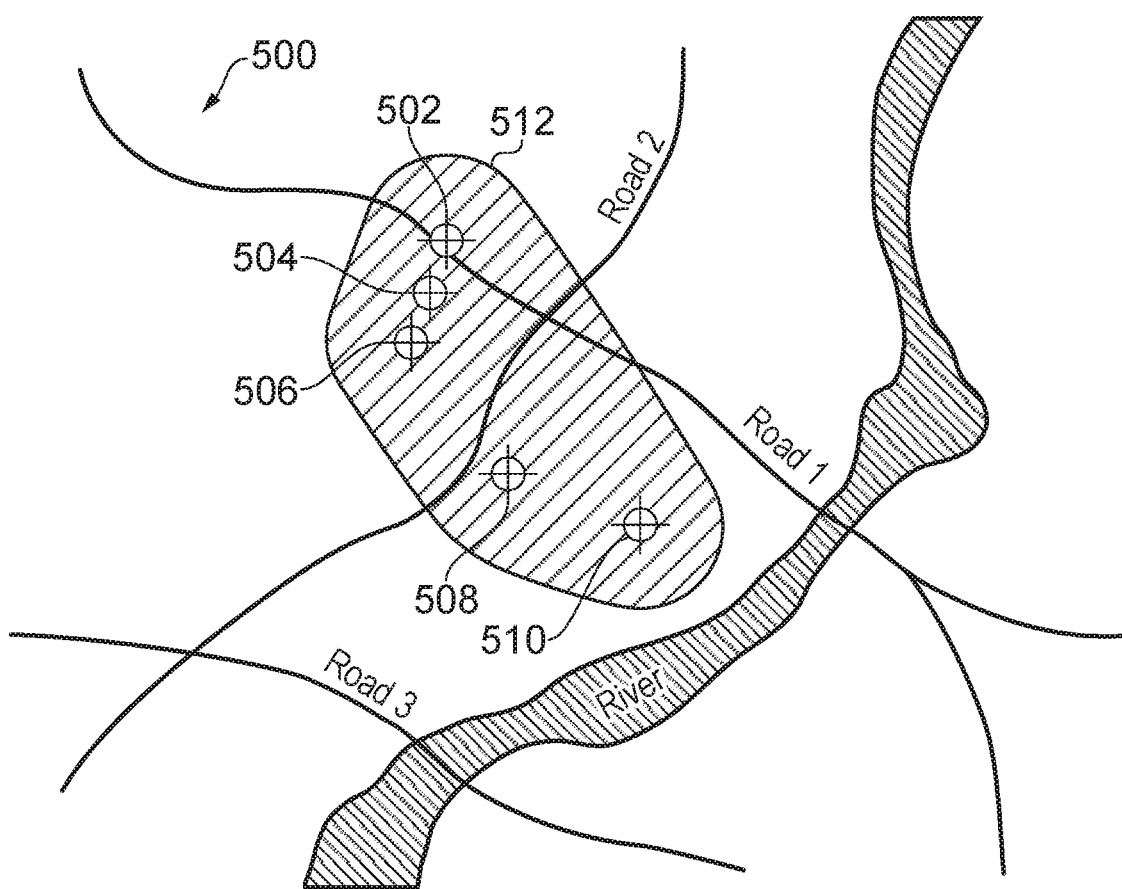
FIG. 5 is a schematic illustration of a map of user queries about network performance.

By way of example, FIG. 5 shows an example of a map 500 on to which the locations of five user queries have been plotted, with a respective circle 502-510 of radius Y drawn around each location. In FIG. 5, an amorphous shape 512 has been created by merging the circles 502-510, although it is worth noting that the amorphous shape is not simply formed by a line tracing the intersecting circumferences of the circles 502-510; it is generally larger than such a shape would be, as is illustrated in FIG. 5. The circles 502-510 may be merged to form the amorphous shape 512 using an algorithm such as a 'Convex Hull' algorithm or a 'Concave Hull' algorithm or any other suitable algorithm. The amorphous shape 512 will be identified as a cluster if the number of queries within the shape—in this instance, five—exceeds the threshold that has been set for cluster identification. Clusters will often start small, like the one depicted in FIG. 5, and then grow, as more and more reports/checks are performed by users. Such 'growth' is often an indication of an unresolved network issue. Likewise, as the clusters shrink again over time, this is an indication that the fault is resolved (or that congestion is reducing, in locations where no actual fault exists).

Figure 6:
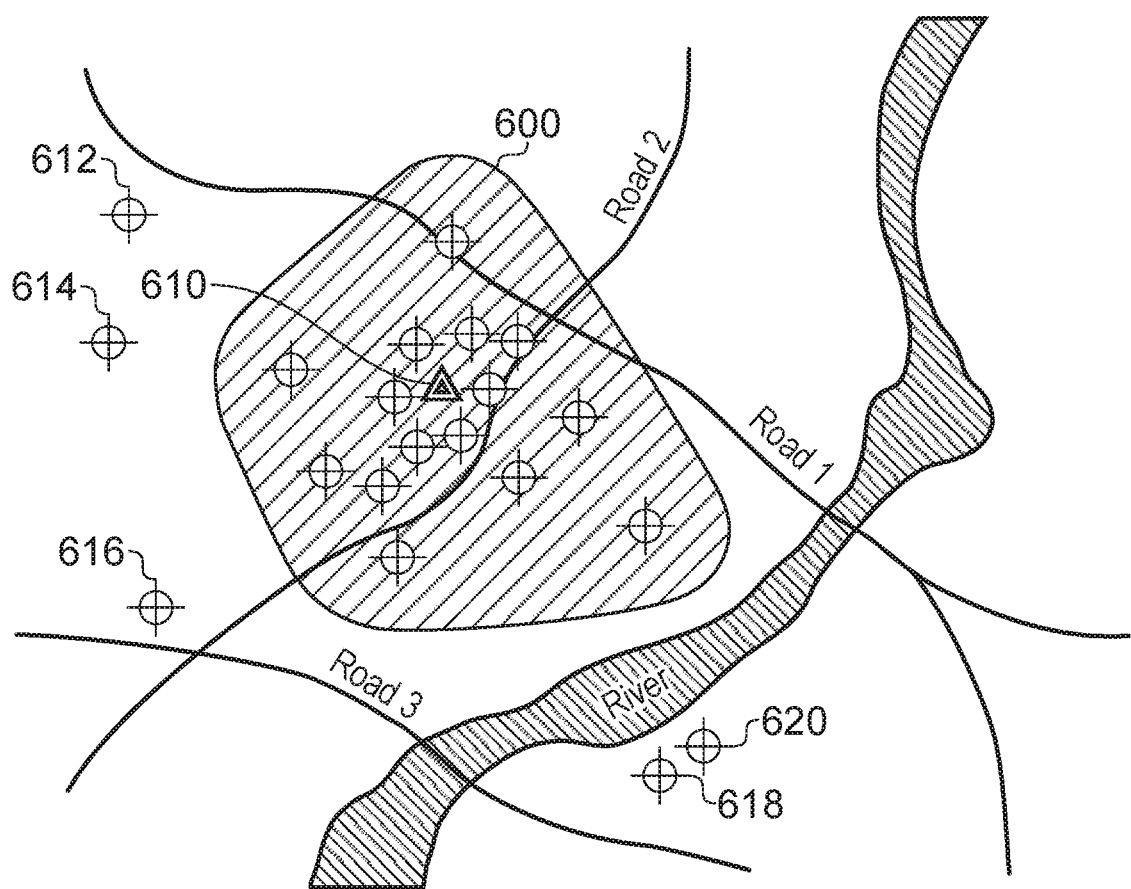
FIG. 6 is a schematic illustration of another map of user queries about the performance of a network.

FIG. 6 shows an example of a cluster 600 in an area experiencing severe disruption to service, together with the location of a known network outage (shown as a triangle 610). Clearly, in this case, the network outage is the explanation for the cluster of checks/reports. Note also, in FIG. 6, that there are a small number of reports 612-620 in the area surrounding the main cluster 600, however these are not sufficient in number to result in their own clusters, nor are they deemed close enough to the main cluster 600 to be included within it (although they may result from the same root cause, i.e. the nearby network outage, forcing consumers onto surrounding base-stations and thereby creating additional congestion in those areas).

The algorithm discussed with reference to FIG. 4 enables the formation of geographic clusters of query reports and their analysis to determine if there is a potential network outage. This approach works well where traffic levels are relatively high and relatively consistent, such as at a city centre location during office hours. The 'sliding 4 hour window' will show a build-up of reports within a cluster, as more and more people encounter the problem, and then a gradual decay once the problem is solved and the impact of users who encountered the issue shortly before it was resolved, fall out of the window. This idealised picture assumes that a relatively constant number of users are served by a given site and a steady percentage of those submit a query or report a problem.

There are many situations, however, which it would be useful to identify, where this is not the case. For example, if a fault occurs late in the evening, some users will encounter the problem and submit a query, however the number of queries will naturally fall as the majority of potential users go to bed. The number may rise again in the morning, if the fault has not otherwise been identified overnight (e.g. by base station or RNC alarms, etc.), but may fall again as commuters leave the area, heading for work. None of these falls in the number of queries indicated that the fault has been resolved, merely that fewer users are encountering the problem, because there are fewer users in the area.

Likewise, if there is an intermittent fault at a particular site, the level of queries can rise and fall multiple times over a longer period. The same effect can also occur due to network congestion, although in this case, the rise and fall in queries should form a more regular pattern, peaking at weekday rush hours, for example.

Likewise, the shape of clusters can change dynamically due to the nature of the customer outage checks—customers submit checks from quasi-random locations within the coverage area of the affected cell or cells and, whilst a very large number of checks would result in an even distribution over time, the smaller numbers of checks typically submitted can lead to a skewing of the cluster shape and this skewing effect changing over time.

An enhanced algorithm that is an enhancement to the approach outlined with respect to FIG. 4 will now be described. This enhanced algorithm provides a way of forming 'super clusters' to detect longer term, lower level, or recurring events at a particular site or sites within a network. In essence, the enhanced algorithm looks at cluster activity over a much longer time period than the window of the normal cluster algorithm. The time window, W, of the normal cluster algorithm 400 could be 4 hours, for example, or any other suitable time period. In doing this, the enhanced algorithm forms larger, 'super clusters' indicating the checks undertaken by customers, and their numerical intensity, over a longer period, say, a 7, 14 or 28 day period. The operation of the enhanced algorithm will now be discussed.

The enhanced algorithm starts and an operator (for example) selects a geographic area to examine. Note that the area to be examined could be selected or highlighted by the operator's software system, which could be designed to bring potential problem areas to the specific attention of the operator, or by any other means. The cluster information for an M day period, for the area under examination, is then retrieved from a cluster store. The number of days, M, could be 7, for example, or any other suitable number (including a fractional number).

Figure 12:
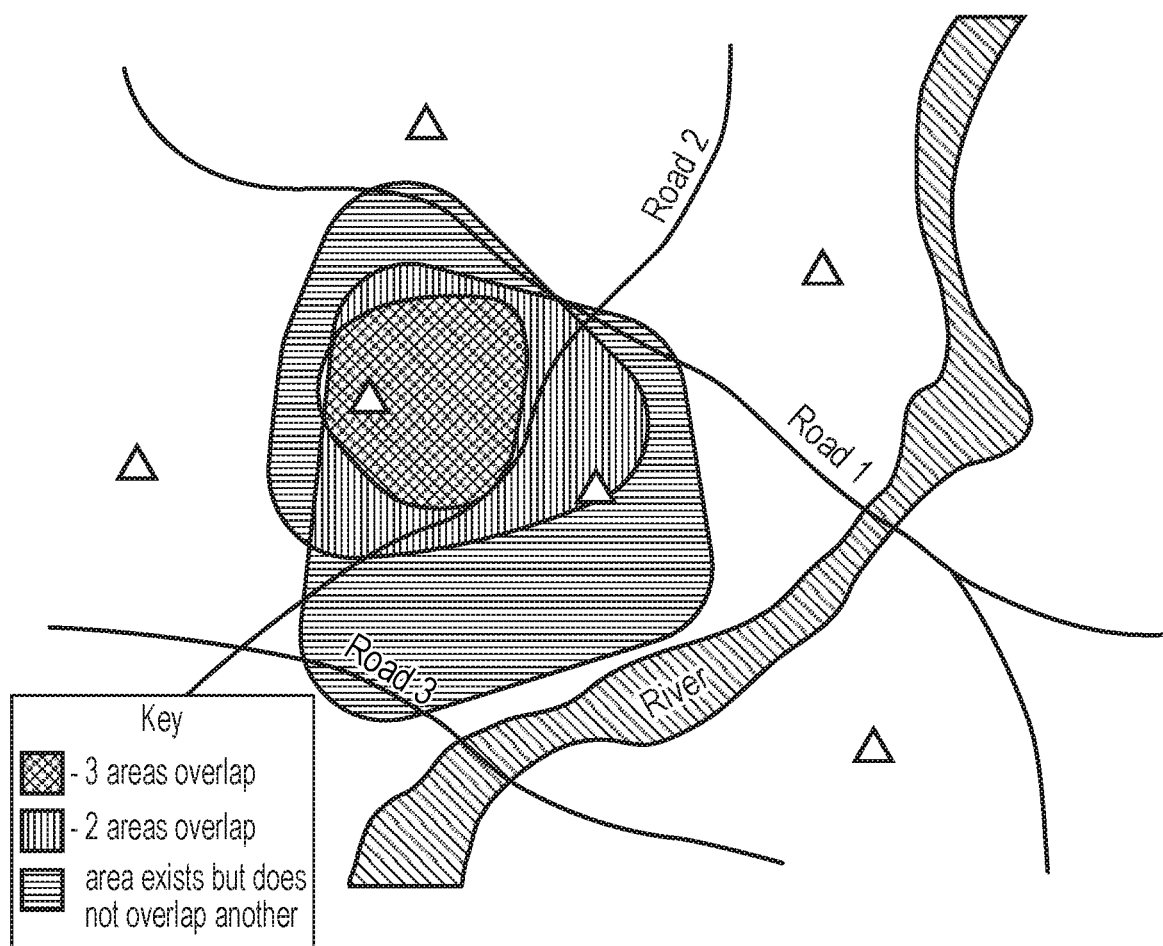
FIG. 12 is a schematic illustration of a map indicating densities of user queries about the performance of a network.

In the next step, the clusters are analysed to identify overlapping clusters and these are further analysed (i.e. stacked) to generate a 'heat map' indicating the density of the stacked clusters. The more X hour clusters from the M day period which cover a given point, the darker, or more vividly coloured, for example, the heat map is at that point. This analysis is repeated for each point on the relevant area of the map being examined by the operator until all of the X hour clusters within the M day period have been analysed. The result is a heat map of the form shown in FIG. 12.

Figure 7:
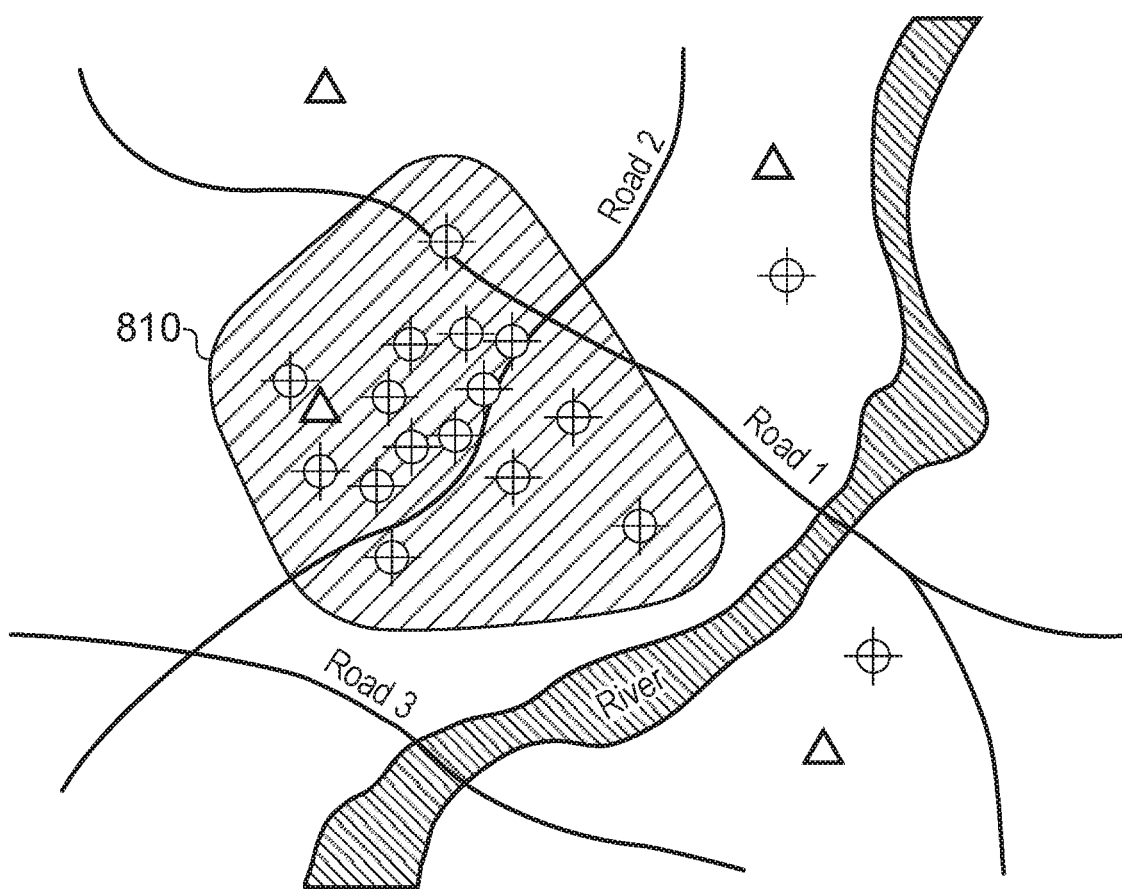
FIG. 7 is a schematic illustration of a further map of user queries about the performance of a network.
Figure 8:
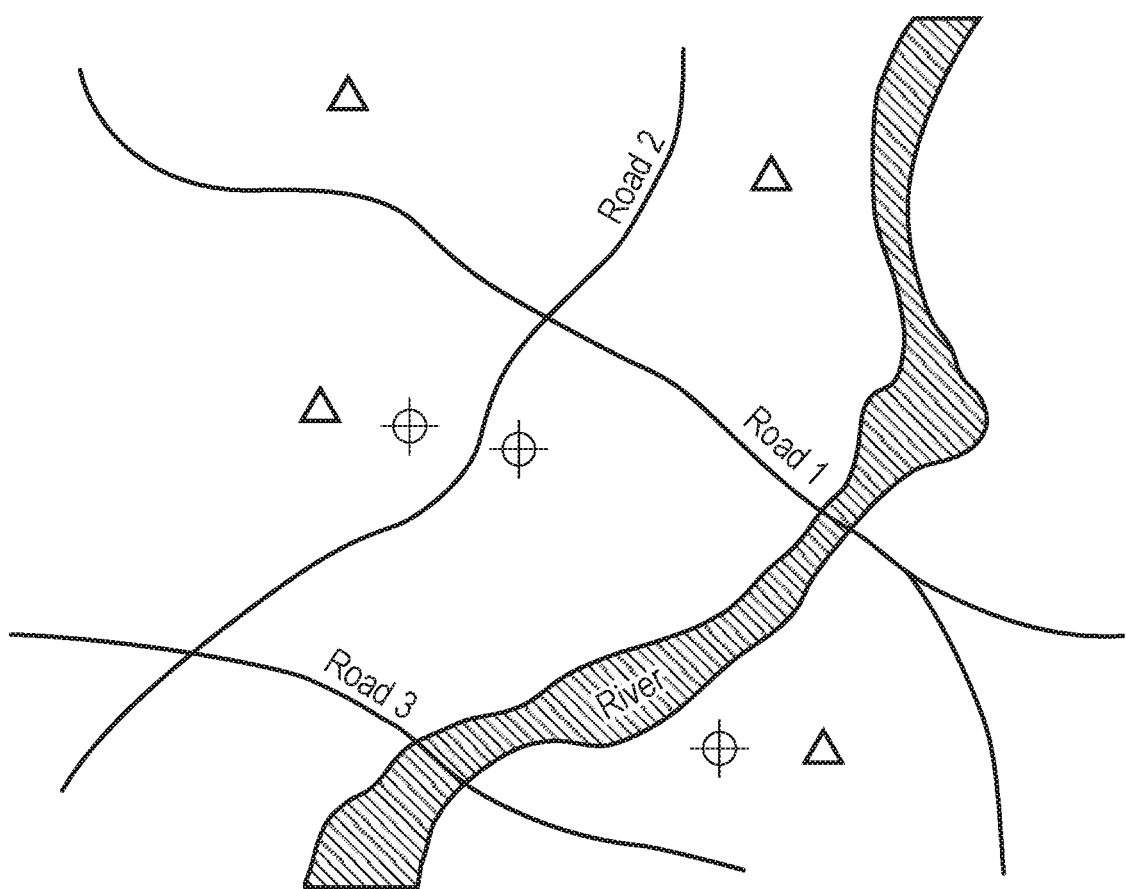
FIG. 8 is a schematic illustration of yet another map of user queries about the performance of a network.
Figure 9:
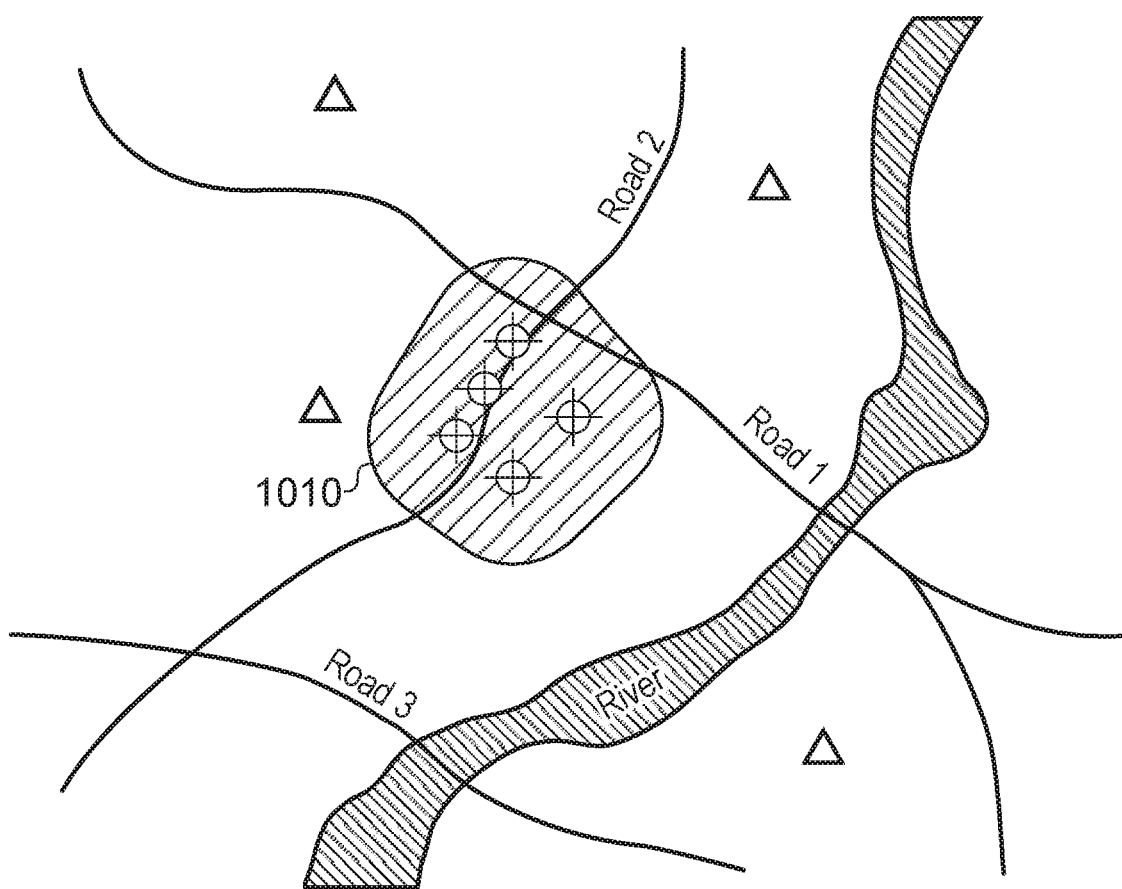
FIG. 9 is a schematic illustration of another map of user queries about the performance of a network.

FIGS. 7 to 9 illustrate a problem of the kind that the enhanced algorithm is intended to address. FIGS. 7 to 9 show 4-hour data sets for the same geographical area, at three different times, T1, T2 and T3. It can be seen that there is relatively little cluster activity and also that a cluster 810 appears in FIG. 7 for time period T1, no cluster appears in FIG. 8 for time period T2, and, in FIG. 9 for time period T3, a cluster 1010 appears, but with a shape different to cluster 810 for time period T1. It could be concluded from FIGS. 7 to 9 that there is not really a significant problem at this map region.

Figure 10:
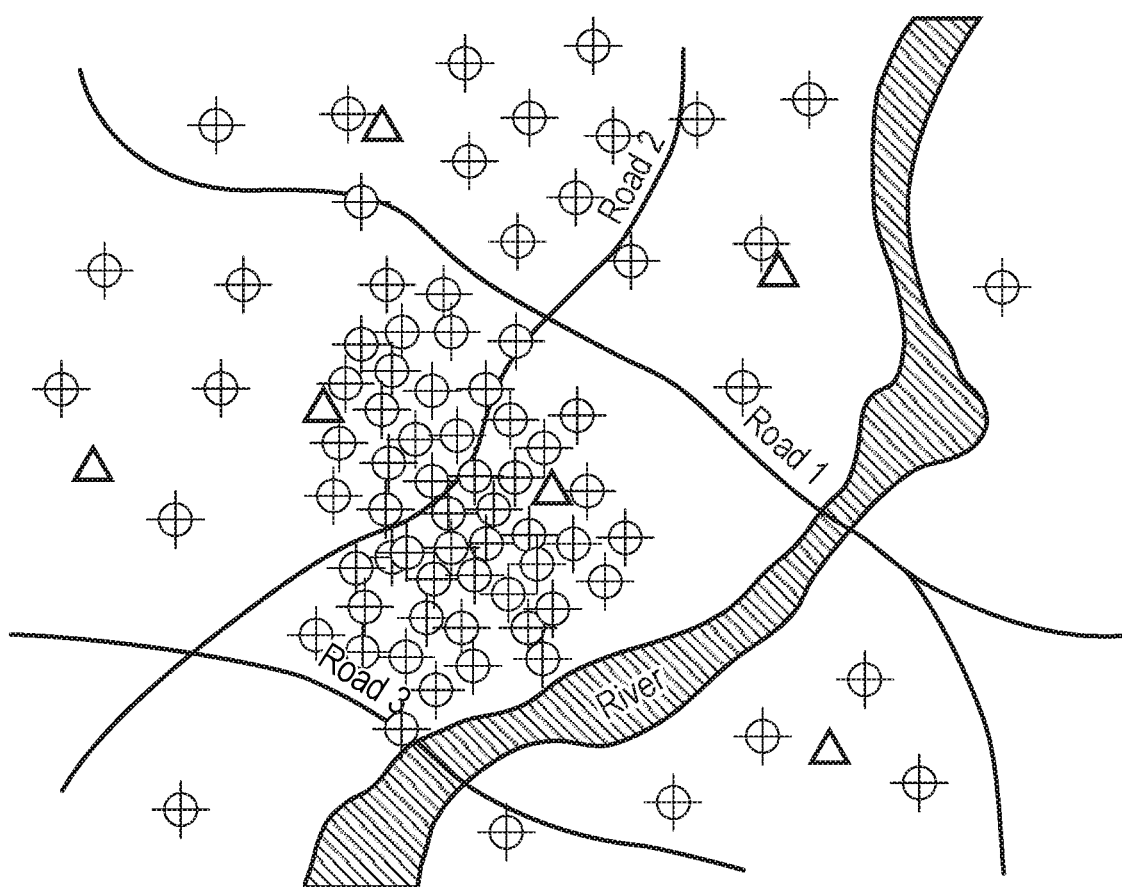
FIG. 10 is a schematic illustration of yet another map of user queries about the performance of a network.

FIG. 10 shows, albeit at a smaller scale, the same geographic area as FIGS. 7 to 9. However, FIG. 10 now shows all of the user coverage checks undertaken in a 28 day period. This now indicates that there may be a problem, but does not show clearly where the problem lies. There are, for example, a number of performance query indicators (as before, circled points) scattered in the upper 5th (approximately) of the picture which may or may not be associated with the remaining performance query indicators.

FIG. 11 shows, again, the same geographic area as FIG. 10. However, in FIG. 11, the 'super cluster' enhanced algorithm has been applied. The various clusters, calculated and stored over the 28 day period, have now been stacked or overlaid and a clear pattern can be seen to emerge, indicating the area impacted (and also that there is clearly a long-running problem in this area). This problem might well have been missed when considering purely the original (4-hour) clusters.

Figure 11:
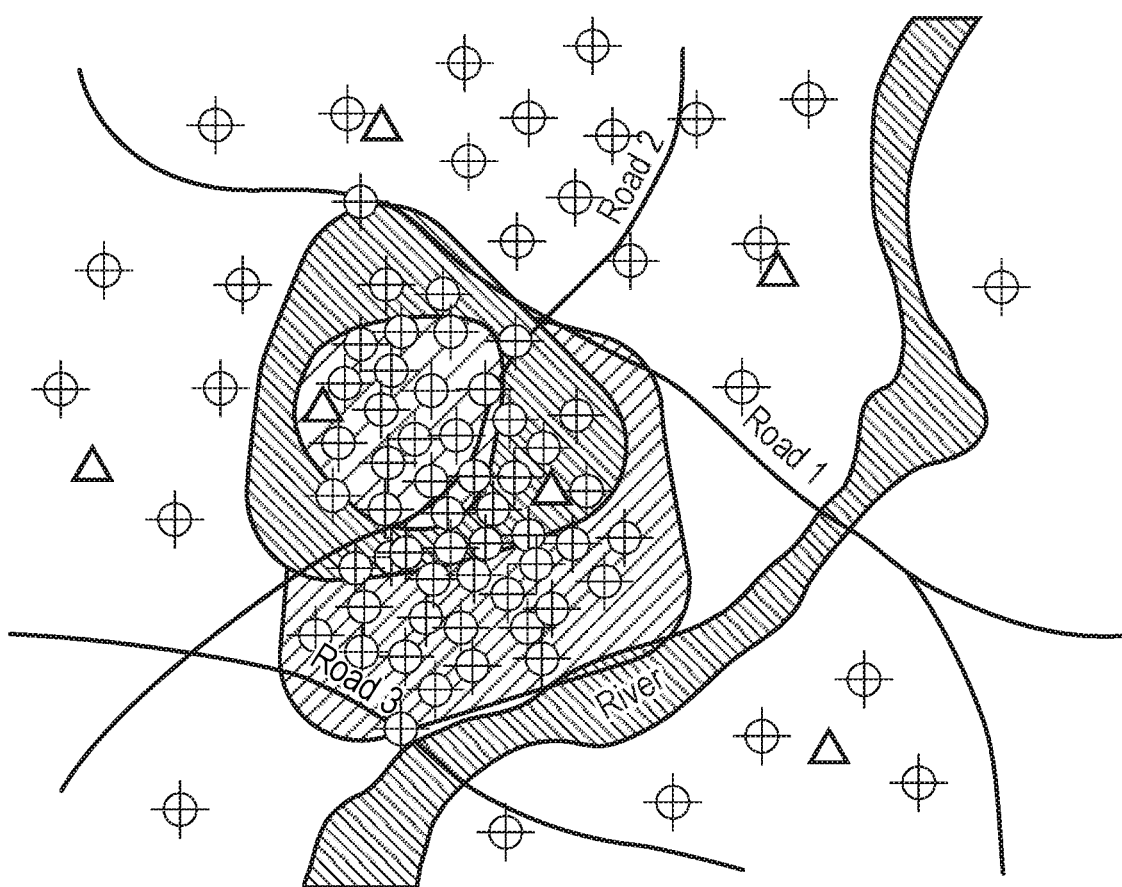
FIG. 11 is a schematic illustration of yet another map of user queries about the performance of a network.

Finally, FIG. 12 again shows the same geographic area as FIGS. 10 and 11. However, in FIG. 12, the overlaid clusters have been amalgamated to produce a heat map of performance query activity over the 28 day period. It is clear from this map which areas of the network are most severely impacted (the black areas) and consequently it is the base-stations in—or closest to—the black areas that are most likely to be at fault.

It is possible to group or cluster the performance queries in other ways. For example, groups of query locations could be formed based upon the actual, known or predicted coverage of base stations, thereby forming clusters based upon base station coverage patterns. This contrasts with the enhanced algorithm which forms clusters of closely-spaced query locations, with no account being taken of whether the query locations are covered by a single, or multiple, base station coverage areas. Given a list of base station coverage areas (e.g. obtained from a planning or coverage prediction tool, or from actual 'drive-test' coverage measurements), it is possible to group performance query locations by base station. Then, if the number of performance queries arising within a given base station's coverage area (in a given time period) exceeded a threshold, it could be reported that there is a potential outage at that base station. An advantage of this approach is that there is then a direct link between user-submitted queries and the base station or stations which are experiencing problems. In the case where the base station coverage areas overlap significantly (as would be the case where the network is a CDMA network), the disadvantage would arise that 'false reports' might arise, for example indicating a problem at the wrong base-station or problems at multiple base-stations when only one base station is actually at fault.

Various embodiments have now been described in the context of monitoring a mobile network. It is possible to apply a system like NSRS 10, NSRS 100 or NSRS 200 to other types of communication networks in which a large number of disparate users rely upon a smaller number of communications 'nodes' in order to receive, amalgamate, route or otherwise process and forward, communications traffic. In this vein, it is possible to apply the invention to a fixed-line data network, such as a 'broadband' internet network (e.g. using DSL or fibre optics or similar). In such a case, the 'nodes', rather than being base stations or cell sites, could be roadside cabinets containing switching or routing equipment or any other equipment which serves a number of users in a given locality. For example, a group of users connected to the same roadside cabinet and who were experiencing poor service, could perform a service check (e.g. using a device connected to a cellular data service) and obtain a similar 'red', 'amber' or 'green' response to a query about their fixed-line service. In this case, poor service could include a poor data speed in the upload direction, the download direction, or both, or it could represent a complete service failure. Again the service checks could be analysed in order to assess whether only a single user is experiencing difficulties, in which case the problem could lie with his/her customer premises equipment (CPE), or whether many users connected to a common point are experiencing difficulties, in which case there is likely to be a fault (or severe congestion) centred on that common point (e.g. street cabinet).

It is also possible to apply a system like NSRS 10, NSRS 100 or NSRS 200 to other types of utility supply networks in which a large number of disparate users rely upon a distributed network of co-operating equipment in order to receive a service. In this context, the service could be a water, electricity or gas supply.

The invention claimed is:

1. A network monitoring tool for fault monitoring in a supply network for a utility, the network monitoring tool comprising:
one or more processors; and
memory storing instructions that, when executed by the one or more processors, cause the one or more processors to:
receive and combine data about the performance of the supply network;
analyse the combined data in order to produce an output, in response to a query from an end user of the network about the performance of the supply network, wherein:
the data comprises information about known non-fault inability of equipment forming part of the supply network to satisfy user demand for the utility, and
the output is at least one of:
identification of a hardware or software fault in the supply network, and
derivation of information about the capability of the supply network to supply the utility, wherein the output is reported by the network monitoring tool to the end user of the supply network that made the query.

2. A network monitoring tool according to claim 1, wherein the information about the capability of the supply network is an assessment of the performance of the supply network at a location specified in the user query.

3. A network monitoring tool according to claim 2, wherein the assessment includes, in respect of a failure in the supply network at the location, an indication of at least one of an expected end time of the failure and a cause of the failure.

4. A network monitoring tool according to claim 1, wherein the data is of several types.

5. A network monitoring tool according to claim 4, wherein combining the data comprises assembling into a record the data of said types as received over a predetermined period of time and wherein:
analyzing the combined data comprises retrieving and analysing the record in order to produce the output; and
the retrieval of the record is not synchronised with the creation of the record.

6. A network monitoring tool according to claim 4, wherein the types are:
information about known non-fault inability of equipment forming part of the supply network to satisfy user demand for the utility; and
one or more of:
a group of one or more alarm signals, each intended to warn of failure of a respective item of equipment forming part of the supply network;
measurements of performance of equipment forming part of the supply network;
geographic locations of equipment forming part of the supply network;
information about maintenance that is scheduled to performed on equipment forming part of the supply network;
information about the extent of a geographic area to which the supply network supplies the utility; and
information about weather where equipment forming part of the supply network is located.

7. A network monitoring tool according to 1, wherein the supply network is a communications network.

8. A network monitoring tool according to claim 7, wherein the communications network comprises a plurality of nodes through which network traffic passes and the information about known non-fault inability includes a time of day at which a flow of network traffic through a node experiences congestion.

9. A network monitoring tool according to claim 7, wherein the communications network is a mobile communications network and said equipment includes one or more of a base station, a cell-site, a radio network controller, a base station controller and a back-haul link.

10. A method of monitoring faults in a supply network for a utility, the method comprising:
receiving and combining data about the performance of the supply network;
analysing the data in order to produce an output in response to a query from an end user of the network about the performance of the supply network, wherein:
the data comprises information about known non-fault inability of equipment forming part of the supply network to satisfy user demand for the utility; and
the output is at least one of:
identification of a hardware or software fault in the supply network, and
derivation of information about the capability of the supply network to supply the utility, wherein the output is reported by the network monitoring tool to the end user of the supply network that made the query.

11. A method according to claim 10, wherein the information about the capability of the supply network is an assessment of the performance of the supply network at a location specified in the user query.

12. A method according to claim 11, wherein the assessment includes, in respect of a failure in the supply network at the location, an indication of at least one of an expected end time of the failure and a cause of the failure.

13. A method according to claim 10, wherein the data is of several types.

14. A method according to claim 13, further comprising assembling into a record the data of said types as received over a predetermined period of time and retrieving and analysing the record in order to produce the output, wherein retrieval of the record is not synchronised with the assembly of the data into the record.

15. A method according to claim 13, wherein the types are:
information about known non-fault inability of equipment forming part of the supply network to satisfy user demand for the utility; and
one or more of:
a group of one or more alarm signals, each intended to warn of failure of a respective item of equipment forming part of the supply network;

measurements of performance of equipment forming part of the supply network;

geographic locations of equipment forming part of the supply network;

information about maintenance that is scheduled to performed on equipment forming part of the supply network;

information about the extent of a geographic area to which the supply network supplies the utility; and information about weather where equipment forming part of the supply network is located.

16. A method according to claim 10, wherein the supply network is a communications network.

17. A method according to claim 16, wherein the communications network comprises a plurality of nodes through which network traffic passes and the information about known non-fault inability includes a time of day at which the flow of traffic through a node experiences congestion.

18. A method according to claim 16, wherein the communications network is a mobile communications network and said equipment includes one or more of a base station, a cell-site, a radio network controller, a base station controller and a back-haul link.

* * * * *